United States Patent
Yang et al.

(10) Patent No.: US 10,705,646 B2
(45) Date of Patent: Jul. 7, 2020

(54) TOUCH DISPLAY PANEL, METHOD FOR DRIVING THE SAME, AND DISPLAY DEVICE

(71) Applicant: BOE Technology Group Co., Ltd., Beijing (CN)

(72) Inventors: Shengji Yang, Beijing (CN); Xue Dong, Beijing (CN); Xiaochuan Chen, Beijing (CN); Minghua Xuan, Beijing (CN); Lei Wang, Beijing (CN); Pengcheng Lu, Beijing (CN); Li Xiao, Beijing (CN); Jie Fu, Beijing (CN); Dongni Liu, Beijing (CN); Jing Yu, Beijing (CN); Yingzi Wang, Beijing (CN); Huijuan Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 88 days.

(21) Appl. No.: 15/774,082

(22) PCT Filed: Nov. 9, 2017

(86) PCT No.: PCT/CN2017/110160
§ 371 (c)(1),
(2) Date: May 7, 2018

(87) PCT Pub. No.: WO2018/205525
PCT Pub. Date: Nov. 15, 2018

(65) Prior Publication Data
US 2019/0107912 A1 Apr. 11, 2019

(30) Foreign Application Priority Data
May 11, 2017 (CN) .......................... 2017 1 0330415

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/0418* (2013.01);
(Continued)

(58) Field of Classification Search
CPC ....... G06F 3/0416; G06F 3/0412; G06F 3/044
See application file for complete search history.

(56) References Cited

U.S. PATENT DOCUMENTS

2017/0090624 A1* 3/2017 Kwon .................... G06F 3/0416
2018/0307368 A1* 10/2018 Koide ................... H01L 27/124

* cited by examiner

*Primary Examiner* — Robert J Michaud
(74) *Attorney, Agent, or Firm* — Arent Fox LLP; Michael Fainberg

(57) ABSTRACT

The disclosure discloses a touch display panel, a method for driving the same, and a display device. The touch display panel includes data lines, a source drive circuit, a first signal line, a second signal line, a synchronous signal line, a plurality of first switches, and a plurality of second switches, in a touch stage, the first switches are turned on under the control of a signal output from the first signal line, a signal synchronous with a touch signal is input to the data lines by the synchronous signal line, and the second switches are turned off under the control of a signal output from the second signal line; and in a display stage, the first switches are turned off under the control of a signal output from the first signal line, and the second switches are turned on under the control of a signal output from the second signal line.

20 Claims, 4 Drawing Sheets

(52) U.S. Cl.
CPC ...... *G06F 3/04164* (2019.05); *G06F 3/04166* (2019.05); *G06F 3/044* (2013.01)

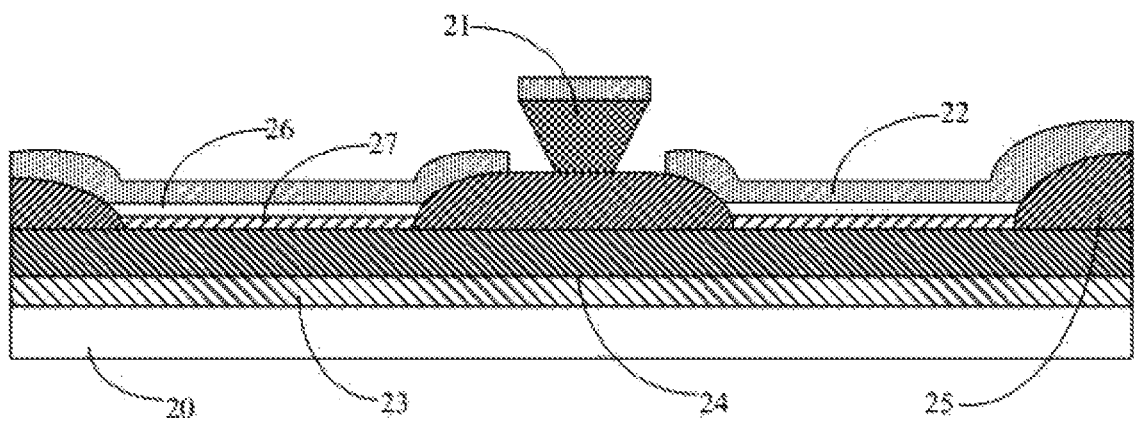

Fig. 3

| In a touch stage, the first switches receive a signal output from the first signal line, and are turned on accordingly, and a signal, synchronous with a touch signal, output from the synchronous signal line is received by the data lines; and the second switches receive a signal output from the second signal line, and are turned off accordingly | — S401 |

| In a display stage, the first switches receive a signal output from the first signal line, and are turned off accordingly; and the second switches receive a signal output from the second signal line, and are turned on accordingly, and data signals output from the source drive circuit are received by the data lines | — S402 |

Fig. 4

TOUCH DISPLAY PANEL, METHOD FOR DRIVING THE SAME, AND DISPLAY DEVICE

This application is a National Stage of International Application No. PCT/CN2017/110160, filed Nov. 9, 2017, which claims priority to Chinese Patent Application No. 201710330415.9, filed May 11, 2017, both of which are hereby incorporated by reference in their entireties.

FIELD

This disclosure relates to the field of touch and display technologies, and particularly to a touch display panel, a method for driving the same, and a display device.

BACKGROUND

As the display technologies are advancing rapidly, a touch display panel has been gradually widespread in people's life. As compared with a traditional display which can only be provided with a display function, a display with the touch display panel can enable a user to exchange information with a display control host, so the touch display panel can take the place of at least a part or all of common input devices, so that the existing display not only can display, but also can accept a touch control. At present, the most widely used touch display panel is a capacitive touch display panel which can be categorized into an in-cell, on-cell, or out-cell touch display panel dependent upon its relative relationships with a Thin Film Transistor (TFT) substrate and a Color Filter (CF) substrate.

The in-cell touch technology compatible with a display panel process has been more and more widely applied, and the in-cell Organic Light Emitting Diode (OLED) touch technology will be more advantageous if it is applied to a flexible OLED product in future.

However the existing in-cell touch display panel comes with the problems of a low touch signal to noise ratio, and poor touch performance.

SUMMARY

Embodiments of the disclosure provide a touch display panel including: a plurality of data lines, a source drive circuit, a first signal line, a second signal line, a synchronous signal line, a plurality of first switches, and a plurality of second switches, wherein: each of the first switches corresponds to one of the data lines, and all of the first switches are electrically connected with the first signal line and the synchronous signal line; and all of the first switches are configured to be turned off under the control of a signal output from the first signal line, or to be turned on under the control of the signal output from the first signal line, so that the synchronous signal line outputs a signal synchronous with a touch signal through the first switches to their corresponding data lines; and each of the second switches corresponds to one of the data lines, and all of the second switches are electrically connected with the second signal line and the source drive circuit; and all of the second switches are configured to be turned off under the control of a signal output from the second signal line to disable the source drive circuit from outputting data signals to corresponding data lines, or to be turned on under the control of the signal output from the second signal line, so that the source drive circuit inputs data signals to corresponding data lines.

In the touch display panel above according to the embodiments of the disclosure, the first switches or the second switches are P-type transistors, and the other of the first switches and the second switches are N-type transistors; and the first signal line and the second signal line refer to a same signal line.

In the touch display panel above according to the embodiments of the disclosure, the second signal line positioned in correspondence to the second switches is arranged in a non-display area proximate to the source drive circuit; and the first signal line positioned in correspondence to the first switches is arranged in a non-display area away from the source drive circuit.

In the touch display panel above according to the embodiments of the disclosure, all of the second switches are electrically connected with the source drive circuit through a multiplexer.

In the touch display panel above according to the embodiments of the disclosure, the touch display panel is a liquid crystal display panel including in-cell touch electrodes; or the touch display panel is an organic light emitting diode display panel including in-cell touch electrodes.

In the touch display panel above according to the embodiments of the disclosure, a common electrode of the liquid crystal display panel is reused as the in-cell touch electrodes, or a cathode layer of the organic light emitting diode display panel is reused as the in-cell touch electrodes.

In the touch display panel above according to the embodiments of the disclosure, the first switches are amorphous silicon thin film transistors or poly-silicon thin film transistors or metal oxide thin film transistors; and the second switches are amorphous silicon thin film transistors or poly-silicon thin film transistors or metal oxide thin film transistors.

The embodiments of the disclosure further provide a display device including the touch display panel above according to the embodiments of the disclosure.

The embodiments of the disclosure further provide a method for driving the touch display panel above according to the embodiments of the disclosure, the method including: in a touch stage, receiving, by the first switches, a signal output from the first signal line to turn on the first switches accordingly, so that data lines corresponding to the first switches receive a signal synchronous with a touch signal, output from the synchronous signal line; and receiving, by the second switches, a signal output from the second signal line to turn off the second switches accordingly; and in a display stage, receiving, by the first switches, a signal output from the first signal line to turn off the first switches accordingly; and receiving, by the second switches, a signal output from the second signal line to turn on the second switches accordingly, so that data lines corresponding to the second switches receive data signals output from the source drive circuit.

In the method above for driving the touch display panel according to the embodiments of the disclosure, in the touch stage, the data lines corresponding to the first switches receive a signal at the same frequency, phase, and amplitude as those of the touch signal, output from the synchronous signal line.

In the method above for driving the touch display panel according to the embodiments of the disclosure, in the touch stage, the signal output from the first signal line is synchronous with the touch signal.

In the method above for driving the touch display panel according to the embodiments of the disclosure, in the touch stage, the signal output from the first signal line is at the same frequency and phase as those of the touch signal.

In the method above for driving the touch display panel according to the embodiments of the disclosure, the signal output from the second signal line is synchronous with the touch signal.

In the method above for driving the touch display panel according to the embodiments of the disclosure, in the touch stage, the signal output from the second signal line is at the same frequency and phase as those of the touch signal.

BRIEF DESCRIPTION OF THE DRAWINGS

FIG. 3 is a schematic structural diagram of an organic light emitting diode display panel with a touch electrode according to the embodiments of the disclosure;

FIG. 4 is a flow chart of a method for driving a touch display panel according to the embodiments of the disclosure;

DETAILED DESCRIPTION OF THE EMBODIMENTS

Embodiments of the disclosure provide a touch display panel, a method for driving the same, and a display device so as to improve in effect a touch signal to noise ratio, and touch performance.

In order to make the objects, technical solutions and advantages more apparent, the disclosure will be described below in further details with reference to the drawings, and apparently the embodiments to be described are only a part but not all of the embodiments of the disclosure. All the other embodiments which can occur to those ordinarily skilled in the art from the embodiments here of the disclosure without any inventive effort shall fall into the scope of the disclosure as claimed.

A touch display panel according to the embodiments of the disclosure will be described below in details with reference to the drawings.

Figure 1:
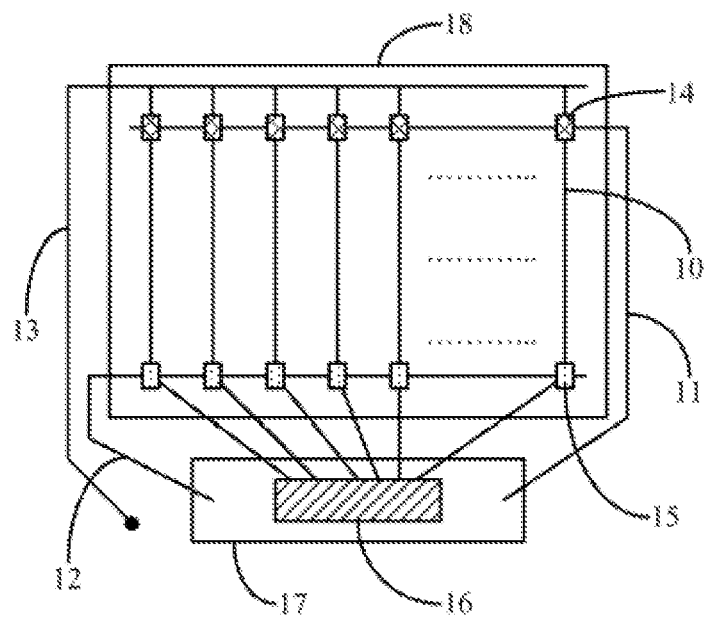
FIG. 1 is a schematic structural diagram of a touch display panel according to embodiments of the disclosure.

As illustrated in FIG. 1, the embodiments of the disclosure provide a touch display panel including a plurality of data lines 10, and in a particular implementation, the data lines 10 can extend in a vertical direction, and be arranged in a horizontal direction, and an arrangement pattern of the data lines 10 is the same as an arrangement pattern in the prior art, so a repeated description thereof will be omitted here. The touch display panel according to the embodiments of the disclosure further include a source drive circuit 16, a first signal line 11, a second signal line 12, a synchronous signal line 13, a plurality of first switches 14, and a plurality of second switches 15; where 18 represents a base substrate of the touch display panel being fabricated, and the base substrate can be a glass substrate; and 17 represents a drive integrated circuit configured to control the entire touch display panel.

Each of the first switches 14 corresponds to one of the data lines 10, and all of the first switches 14 are electrically connected with the first signal line 11 and the synchronous signal line 13; and all of the first switches 14 are configured to be turned off under the control of a signal output from the first signal line 11 in a display stage, and to be turned on under the control of a signal output from the first signal line 11 in a touch stage, so that the synchronous signal line 13 outputs a signal synchronous with a touch signal through the first switches 14 to their corresponding data lines 10.

Each of the second switches 15 corresponds to one of the data lines 10, and all of the second switches 15 are electrically connected with the second signal line 12 and the source drive circuit 16; and all of the second switches 15 are configured to be turned off under the control of a signal output from the second signal line 12 in the touch stage to disable the source drive circuit 16 from outputting data signals to corresponding data lines 10, and to be turned on under the control of a signal output from the second signal line 12 in the display stage so that the source drive circuit 16 inputs data signals to corresponding data lines 10.

Particularly the signal synchronous with the touch signal, input from the synchronous signal line 13 and received by the data lines 10 in the embodiments of the disclosure is exactly the same as the touch signal, that is, the signal received by the data lines 10 is a signal not only at the same frequency and phase as those of the touch signal, but also has the same voltage amplitude as that of the touch signal; or of course, the signal received by the data lines 10 can alternatively be a signal at the same frequency and phase as those of the touch signal, and at an amplitude with a fixed difference from that of the touch signal, in a practical design.

In the touch display panel according to the embodiments of the disclosure, in the touch stage, all the first switches 14 are turned on under the control of a signal output from the first signal line 11, so that the synchronous signal line 13 can output a signal synchronous with a touch signal through the first switches 14 to their corresponding data lines 10; and all the second switches 15 are turned off under the control of a signal output from the second signal line 12 to disconnect the source drive circuit 16 from the corresponding data lines 10. And in the touch stage, a capacitor borne by a touch electrode is a basic capacitor plus a human body capacitor, and a touch position can only be determined accurately from such a change in capacitance on the touch electrode that arises from the human body capacitor, so an influence of the basic capacitor can only be alleviated by keeping a difference in potential between a signal on another electrode and a signal on the touch electrode being consistent, and since the signals received on all the data lines 10 are signals synchronous with the touch signal, the difference in potential between the signals on the data lines 10 and the signal on the touch electrode can be kept consistent to thereby improve in effect a touch signal to noise ratio, and touch performance. Moreover in the display stage, all the first switches 14 are turned off under the control of a signal output from the first signal line 11, and all the second switches 15 are turned on under the control of a signal output from the second signal line 12, so in the display stage, the data lines 10 will not be influenced by the signal, synchronous with the touch signal, output from the synchronous signal line 13, but the data signals output by the source drive circuit 16 can be received on the data lines 10 to thereby display normally in grayscales.

Optionally as illustrated in FIG. 1, in the embodiments of the disclosure, the second signal line 12 positioned in correspondence to the second switches 15 is typically arranged in a non-display area proximate to the source drive circuit 16; and the first signal line 11 positioned in correspondence to the first switches 14 is typically arranged in a non-display area away from the source drive circuit 16, so that the first signal line 11 and the second line 12 in the embodiments of the disclosure can be routed more simply and conveniently without hindering the touch display panel from displaying, and can also be avoided as much as possible from influencing the other lines on the touch display panel.

Optionally all the second switches 15 in the embodiments of the disclosure can be electrically connected with the source drive circuit 16 through a multiplexer (MUX), and the multiplexer can connect a plurality of data lines 10 with a signal output port of the source drive circuit 16, and drive respective data lines 10 in a time division mode to output their data signals; and the multiplexer can be arranged to thereby reduce the number of ports of the source drive circuit 16, and lower the complexity of the source drive circuit 16 so as to lower a production cost.

Optionally in the embodiments of the disclosure, the first switches 14 are typically Thin Film Transistors (TFTs), and the second switches 15 are typically TFTs. Particularly the first switches 14 can be amorphous silicon TFTs or poly-silicon TFTs or metal oxide TFTs; and correspondingly the second switches 15 can be amorphous silicon TFTs or poly-silicon TFTs or metal oxide TFTs.

Furthermore in order to facilitate a fabrication process, the first switches 14 and the second switches 15 are of the same TFT type, e.g., amorphous silicon TFTs.

Optionally in the embodiments of the disclosure, the first switches 14 can be P-type transistors, and the second switches 15 can also be P-type transistors; or the first switches 14 can be N-type transistors, and the second switches 15 can also be N-type transistors; or the first switches 14 can be P-type transistors, and the second switches 15 can be N-type transistors; or the first switches 14 can be N-type transistors, and the second switches 15 can be P-type transistors.

Optionally in the embodiments of the disclosure, the first switches 14 and the second switches 15 can alternatively be metal oxide semiconductor field effect transistors. Particularly the first switches 14 can be P-type metal oxide semiconductor field effect transistors, and the second switches 15 can be P-type metal oxide semiconductor field effect transistors; or the first switches 14 can be N-type metal oxide semiconductor field effect transistors, and the second switches 15 can be N-type metal oxide semiconductor field effect transistors; or the first switches 14 can be P-type metal oxide semiconductor field effect transistors, and the second switches 15 can be N-type metal oxide semiconductor field effect transistors; or the first switches 14 can be N-type metal oxide semiconductor field effect transistors, and the second switches 15 can be P-type metal oxide semiconductor field effect transistors.

Figure 2:
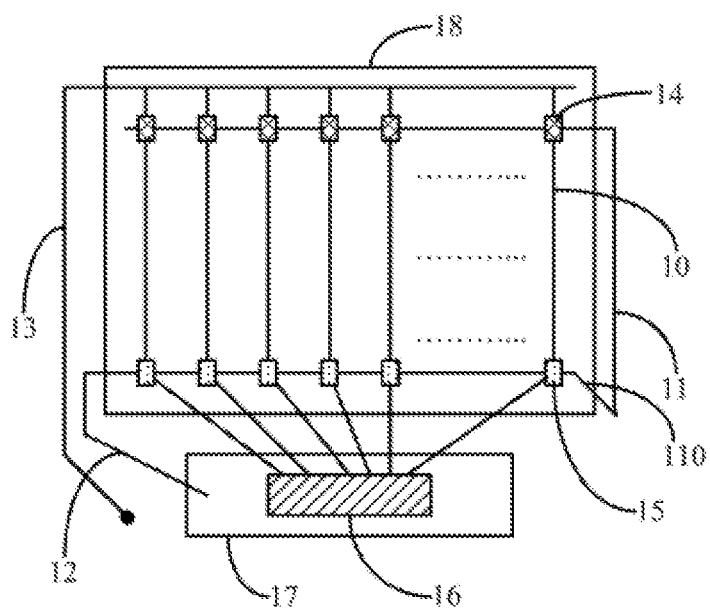
FIG. 2 is a schematic structural diagram of another touch display panel according to the embodiments of the disclosure.

Particularly as illustrated in FIG. 2, when the first switches 14 or the second switches 15 in the embodiments of the disclosure are P-type transistors, and the other of the first switches and the second switches are N-type transistors, the first signal line 11 and the second signal line 12 in the embodiments of the disclosure can refer to a same signal line, that is, the first signal line 11 and the second signal line 12 can be electrically connected by a connection line 110, and at this time, the first signal line 11 and the second signal line 12 can be equivalent to one signal line, and a signal can simply be input to either of the first signal line 11 and the second signal line 12 to thereby save power consumption of the circuit, and also simplify the circuit.

In the embodiments of the disclosure, both the first switches 14 and the second switches 15 are TFTs as described above by way of an example, and in a particular implementation, sources and drains of the first switches 14 and the second switches 15 can be replaced with each other instead of being distinguished from each other.

Particularly in the touch stage, when the first switches 14 in the embodiments of the disclosure are P-type TFTs, the signal output from the first signal line 11 is a low-level (e.g., VSS) signal, and the first switches 14 are turned on under the control of the signal output from the first signal line 11; and when the first switches 14 are N-type TFTs, the signal output from the first signal line 11 is a high-level (e.g., VDD) signal, and the first switches 14 are turned on under the control of the signal output from the first signal line 11.

Optionally the signal output from the first signal line 11 is synchronous with the touch signal in the touch stage, where the signal output from the first signal line 11 refers to a signal to control the first switches 14 to be turned on in the touch stage. Particularly the signal output from the first signal line 11 can be exactly the same signal as the touch signal, or can be a signal at the same frequency and phase as those of the touch signal, and at amplitude with a fixed difference from that of the touch signal. Therefore in the touch stage, a capacitor borne by a touch electrode is a basic capacitor plus a human body capacitor, and a touch position can only be determined accurately from such a change in capacitance on the touch electrode that arises from the human body capacitor, so an influence of the basic capacitor can only be alleviated by keeping a difference in potential between a signal on another electrode and a signal on the touch electrode being consistent (preferably a zero difference in potential between the signal on the other electrode, and the signal on the touch electrode); and the first signal line 11 in the embodiments of the disclosure is an electrode line arranged on the touch display panel, so when the signal output from the first signal line 11 is synchronous with the touch signal, an influence of the first signal line 11 upon the touch electrode can be further alleviated to thereby further improve a touch signal to noise ratio, and touch performance.

Particularly in the touch stage, when the second switches 15 in the embodiments of the disclosure are P-type TFTs, the signal output from the second signal line 12 is a high-level (e.g., VDD) signal, and the second switches 15 are turned off under the control of the signal output from the second signal line 12; and when the second switches 15 in the embodiments of the disclosure are N-type TFTs, the signal output from the second signal line 12 is a low-level (e.g., VSS) signal, and the second switches 15 are turned off under the control of the signal output from the second signal line 12.

Optionally in the touch stage, the signal output from the second signal line 12 is synchronous with the touch signal, where the signal output from the second signal line 12 refers to a signal to control the second switches 15 to be turned off in the touch stage; and particularly the signal output from the second signal line 12 can be exactly the same signal as the touch signal, or can be a signal at the same frequency and phase as those of the touch signal, and at an amplitude with a fixed difference from that of the touch signal, so that in the touch stage, a capacitor borne by a touch electrode is a basic capacitor plus a human body capacitor, and a touch position can only be determined accurately from such a change in capacitance on the touch electrode that arises from the human body capacitor, so an influence of the basic capacitor can only be alleviated by keeping a difference in potential between a signal on another electrode and a signal on the touch electrode being consistent (preferably a zero difference in potential between the signal on the other electrode, and the signal on the touch electrode); and the second signal line 12 in the embodiments of the disclosure is an electrode line arranged on the touch display panel, so when the signal output from the second signal line 12 is synchronous with the touch signal, an influence of the second signal line 12 upon the touch electrode can be further alleviated to thereby further improve a touch signal to noise ratio, and touch performance.

Optionally the touch display panel in the embodiments of the disclosure can be a liquid crystal display panel including in-cell touch electrodes; and particularly a common electrode of the liquid crystal display panel can be reused as the in-cell touch electrodes, and in this setting, the common electrode can be divided into a plurality of electrode pieces arranged in an array, where each electrode piece is a self-capacitive touch electrode, and each self-capacitive touch electrode is connected with a touch detecting chip through a touch lead wire. The common electrode can be reused as the touch electrodes, and a touch position can be detected, particularly as in the prior art, so a repeated description thereof will be omitted here.

Optionally the touch display panel in the embodiments of the disclosure can be an organic light emitting diode display panel including in-cell touch electrodes. Particularly as illustrated in FIG. 3, a cathode layer of the organic light emitting diode display panel can be reused as the in-cell touch electrodes, where the cathode layer is located atop all the other functional layers; and the cathode layer is segmented by Post Spacer (PS) 21 into cathodes 22 reused as self-capacitive touch electrodes. The cathodes 22 can be reused as the self-capacitive touch electrodes, and a touch position can be detected, particularly as in the prior art, so a repeated description thereof will be omitted here. In FIG. 3, 20 represents a base substrate which can particularly be a glass substrate or can be a flexible substrate; 23 represents a metal layer which can particularly be a metal layer fabricated at the same layer as a source layer of a thin film transistor in a pixel circuit; 24 represents a planarization layer; 25 represents a pixel definition layer; 26 represents a light emitting layer; and 27 represents an anode, where the PS 21 can be negative photoresist, and the cathode 22 can be a metal material or can be a transparent conductive material (e.g., Indium Tin Oxide). The thicknesses of respective film layers, and the sizes and shapes of respective areas in FIG. 3 are not intended to reflect any real proportion of the respective film layers, but only intended to illustrate the disclosure.

Based upon the same inventive idea, the embodiments of the disclosure further provide a display device including the touch display panel above according to the embodiments of the disclosure, and the display device can be a mobile phone, a tablet computer, a liquid crystal TV set, an OLED TV set, a notebook computer, a digital photo frame, a navigator, or any other product or component with a display function. All the other components indispensable to the display device shall readily occur to those ordinarily skilled in the art, so a repeated description thereof will be omitted here.

Based upon the same inventive idea, the embodiments of the disclosure further provide a method for driving the touch display panel above, and as illustrated in FIG. 4, the method includes the following operations.

In the operation S401, in a touch stage, the first switches receive a signal output from the first signal line, and are turned on accordingly, and a signal, synchronous with a touch signal, output from the synchronous signal line is received by the data lines; and the second switches receive a signal output from the second signal line, and are turned off accordingly.

In the operation S402, in a display stage, the first switches receive a signal output from the first signal line, and are turned off accordingly; and the second switches receive a signal output from the second signal line, and are turned on accordingly, and data signals output from the source drive circuit are received by the data lines.

Optionally the signal, synchronous with the touch signal, output from the synchronous signal line can be received by the data lines in the operation S401 as follows: the signal, at the same phase and amplitude as those of the touch signal, output from the synchronous signal line is received by the data lines. Of course, the signal, at the same phase as that of the touch signal, output from the synchronous signal line can be received by the data lines, although the embodiments of the disclosure will not be limited thereto.

Optionally in the touch stage, the signal output from the first signal line in the embodiments of the disclosure can be synchronous with the touch signal. Particularly the signal, synchronous with the touch signal, output from the first signal line can be a signal, at the same phase as that of the touch signal, output from the first signal line.

Optionally in the touch stage, the signal output from the second signal line in the embodiments of the disclosure can be synchronous with the touch signal. Particularly the signal, synchronous with the touch signal, output from the second signal line can be a signal, at the same phase as that of the touch signal, output from the second signal line.

Optionally in the display stage, the signal output from the first signal line in the embodiments of the disclosure can be a constant voltage signal; and the signal output from the second signal line can be a constant voltage signal.

The method for driving the touch display panel according to the embodiments of the disclosure will be described below in details in connection with a particular embodiment thereof.

In the embodiments of the disclosure, the first switches 14 are P-type TFTs, and the second switches 15 are P-type TFTs, for example.

Figure 5:
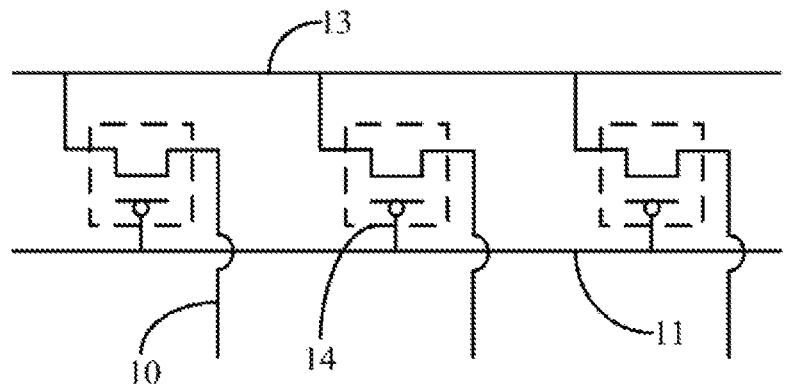
FIG. 5 is a schematic diagram of a connection pattern of first switches according to the embodiments of the disclosure.

The first switches 14 are particularly connected as illustrated in FIG. 5, where the first switches 14 have gates connected with the first signal line 11, sources connected with the synchronous signal line 13, and drains connected with the data lines 10; and the arcs at the positions where the data lines 10 and the first signal line 11 intersect with each other indicate that the data lines 10 and the first signal line 11 are arranged insulated from each other at their intersections.

Figure 6:
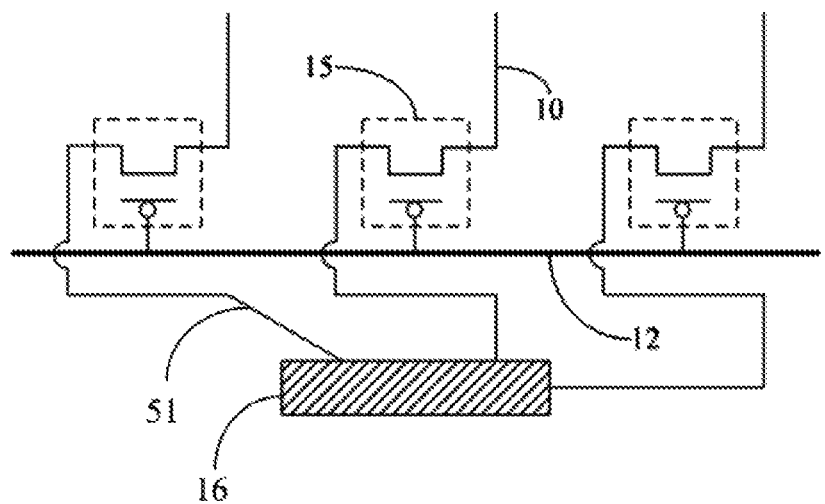
FIG. 6 is a schematic diagram of a connection pattern of second switches according to the embodiments of the disclosure.

The second switches 15 are particularly connected as illustrated in FIG. 6, where the second switches 15 have gates connected with the second signal line 12, sources connected with lead wires 51 of the source drive circuit 16, and drains connected with the data lines 10; and when the second switches 15 are turned on, the source drive circuit 16 outputs data signals to the data lines 10, and when the second switches 15 are turned off, the source drive circuit 16 is disabled from outputting the data signals to the data lines 10.

Figure 7:
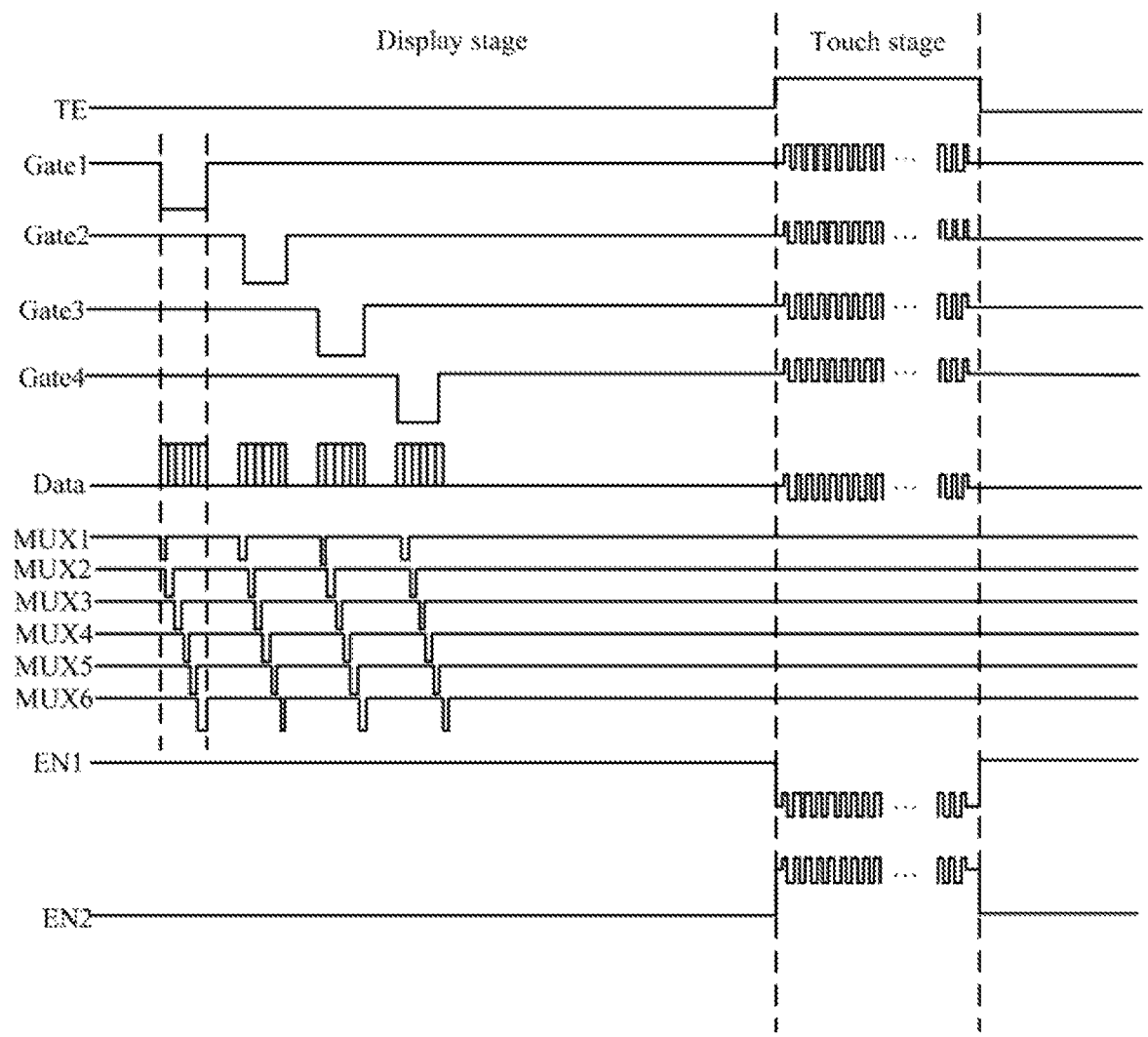
FIG. 7 is a time sequence diagram of a touch display panel according to the embodiments of the disclosure.

FIG. 7 illustrates a time sequence diagram of the touch display panel according to the embodiments of the disclosure, where TE represents an enabling signal to control the touch display panel in the display stage and the touch stage;

Gate1, Gate2, Gate3, and Gate4 represent gate scan signals, where the gate scan signals scan sequentially per row in the display stage, particularly as in the prior art, so a repeated description thereof will be omitted here. Data represents a data signal, where Data is controlled by 1:6 MUX (MUX1 to MUX6) signals to be input in a time division mode in the display stage, particularly as in the prior art, so a repeated description thereof will be omitted here. EN1 represents a signal output from the first signal line 11 in the embodiments of the disclosure, and EN2 represents a signal output from the second signal line 12 in the embodiments of the disclosure.

As illustrated in FIG. 7, in the display stage, the signal output from the first signal line 11 is a disabling signal, e.g., a constant high-level signal, and the signal output the second signal line 12 is an enabling signal, e.g., a constant low-level signal. In the touch stage, the signal output from the first signal line 11 is pulled down, and particularly a low-level signal synchronous with a touch signal, and for example, the maximum amplitude of the low-level signal is −7V+V0, and the minimum amplitude thereof is −7V−V0, where the value of V0 ranges from 1.5V to 2.5V; and the signal output from the second signal line 12 is pulled up, and particularly a high-level signal synchronous with a touch signal, and for example, the maximum amplitude of the high-level signal is 7V+V0, and the minimum amplitude thereof is 7V−V0.

In the touch stage: the first switches 14 receive the signal output from the first signal line 11, and are turned on; a signal (i.e. modulation signal), synchronous with the touch signal, output from the synchronous signal line 13 is received by the data lines 10; and at this time, the signal received on all the data lines 10 is synchronous with the touch signal to thereby alleviate an influence of the data lines 10 upon a touch electrode so as to improve touch performance; and also the second switches 15 receive the signal output from the second signal line, and are turned off, and at this time, the data lines 10 will not be influenced by the signals output by the source drive circuit.

Furthermore in the touch stage, the MUX signals in the embodiments of the disclosure can also be signals synchronous with the touch signal, but the MUX signals may simply be maintained as high-level signals as illustrated in FIG. 7 in view of the source drive circuit, and no influence of the signals output by the source drive circuit upon the data lines 10 in the touch stage.

In the display stage: the first switches 14 receive the signal output from the first signal line 11, and are turned off, and at this time, the data lines 10 will not be influenced by the signal, synchronous with the touch signal, output from the synchronous signal line 13; and the second switches 15 receive the signal output from the second signal line 12, and are turned on, and the data signals output by the source drive circuit 16 are received by the data lines 10 to display normally in grayscales particularly as in the prior art, so a repeated description thereof will be omitted here.

In summary, the embodiments of the disclosure provide a touch display panel including a plurality of data lines, a source drive circuit, a first signal line, a second signal line, a synchronous signal line, a plurality of first switches, and a plurality of second switches; each first switch corresponds to one of the data lines, and all the first switches are electrically connected with the first signal line and the synchronous signal line; and each second switch corresponds to one of the data lines, and all the second switches are electrically connected with the second signal line, where: in a touch stage, all the first switches are turned on under the control of a signal output from the first signal line, a signal synchronous with a touch signal is input by the synchronous signal line through the first switches to their corresponding data lines, and all the second switches are turned off under the control of a signal output from the second signal line to disable the source drive circuit from outputting data signals to corresponding data lines. And in the display stage, all the first switches are turned off under the control of a signal output from the first signal line, and all the second switches are turned on under the control of a signal output from the second signal line. In the touch display panel according to the embodiments of the disclosure, in the touch stage, all the first switches are turned on under the control of a signal output from the first signal line, a signal synchronous with a touch signal is input by the synchronous signal line through the first switches to their corresponding data lines, and all the second switches are turned off under the control of a signal output from the second signal line to disable the source drive circuit from outputting data signals to corresponding data lines; and in the touch stage, a capacitor borne by a touch electrode is a basic capacitor plus a human body capacitor, where the human body capacitor is used for determining a touch position, and the basic capacitor is a capacitor not desired, therefore, an influence of the basic capacitor can only be alleviated by keeping a difference in potential between a signal on another electrode and a signal on the touch electrode being consistent, and since the signal received on all the data lines is a signal synchronous with the touch signal, the difference in potential between the signals on the data lines and the signal on the touch electrode can be kept consistent to thereby improve in effect a touch signal to noise ratio, and touch performance. Moreover in the display stage, all the first switches are turned off under the control of a signal output from the first signal line, and all the second switches are turned on under the control of a signal output from the second signal line, so in the display stage, the data lines will not be influenced by the signal, synchronous with the touch signal, output from the synchronous signal line, but the data signals output by the source drive circuit can be received by the data lines to thereby display normally in grayscales.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A touch display panel, comprising: a plurality of data lines, a plurality of touch electrodes, a plurality of touch electrode lines, a source drive circuit, a first signal line, a second signal line, a synchronous signal line, a plurality of first switches, and a plurality of second switches, wherein:

each of the first switches corresponds to one of the data lines, and all of the first switches are electrically connected with the first signal line and the synchronous signal line; and all of the first switches are configured to be turned off under the control of a signal output from the first signal line; or to be turned on under the control of the signal output from the first signal line in the touch stage, so that the synchronous signal line outputs a signal synchronous with a touch signal of the plurality of touch electrode lines through the first switches to their corresponding data lines; and each of the second switches corresponds to one of the data lines, and all of the second switches are electrically connected with the second signal line and the source drive circuit; and all of the second switches are configured to be turned off under the control of a signal output from the second signal line to disable the source drive circuit from outputting data signals to corresponding data lines, and to be turned on under the control of the signal output from the second signal line, so that the source drive circuit inputs data signals to corresponding data lines.

2. The touch display panel according to claim 1, wherein the first switches or the second switches are P-type transistors, and the other of the first switches and the second switches are N-type transistors; and
the first signal line and the second signal line refer to a same signal line.

3. The touch display panel according to claim 1, wherein the second signal line positioned in correspondence to the second switches is arranged in a non-display area proximate to the source drive circuit; and the first signal line positioned in correspondence to the first switches is arranged in a non-display area away from the source drive circuit.

4. The touch display panel according to claim 1, wherein all of the second switches are electrically connected with the source drive circuit through a multiplexer.

5. The touch display panel according to claim 1, wherein the touch display panel is a liquid crystal display panel comprising in-cell touch electrodes; or the touch display panel is an organic light emitting diode display panel comprising in-cell touch electrodes.

6. The touch display panel according to claim 5, wherein a common electrode of the liquid crystal display panel is reused as the in-cell touch electrodes, or a cathode layer of the organic light emitting diode display panel is reused as the in-cell touch electrodes.

7. The touch display panel according to claim 1, wherein the first switches are amorphous silicon thin film transistors or poly-silicon thin film transistors or metal oxide thin film transistors; and
the second switches are amorphous silicon thin film transistors or poly-silicon thin film transistors or metal oxide thin film transistors.

8. A display device, comprising a touch display panel, wherein the touch display panel comprising a plurality of data lines, a plurality of touch electrodes, a plurality of touch electrode lines, a source drive circuit, a first signal line, a second signal line, a synchronous signal line, a plurality of first switches, and a plurality of second switches, wherein:
each of the first switches corresponds to one of the data lines, and all of the first switches are electrically connected with the first signal line and the synchronous signal line; and all of the first switches are configured to be turned off under the control of a signal output from the first signal line; or to be turned on under the control of the signal output from the first signal line in the touch stage, so that the synchronous signal line outputs a signal synchronous with a touch signal of the plurality of touch electrode lines through the first switches to their corresponding data lines; and
each of the second switches corresponds to one of the data lines, and all of the second switches are electrically connected with the second signal line and the source drive circuit; and all of the second switches are configured to be turned off under the control of a signal output from the second signal line to disable the source drive circuit from outputting data signals to corresponding data lines, and to be turned on under the control of the signal output from the second signal line, so that the source drive circuit inputs data signals to corresponding data lines.

9. A method for driving the touch display panel according to claim 1, the method comprising:
in the touch stage, receiving, by the first switches, the signal output from the first signal line to turn on the first switches accordingly, so that data lines corresponding to the first switches receive the signal synchronous with the touch signal, output from the synchronous signal line; and receiving, by the second switches, the signal output from the second signal line to turn off the second switches accordingly; and
in the display stage, receiving, by the first switches, the signal output from the first signal line to turn off the first switches accordingly; and receiving, by the second switches, the signal output from the second signal line to turn on the second switches accordingly, so that data lines corresponding to the second switches receive data signals output from the source drive circuit.

10. The method according to claim 9, wherein in the touch stage, the data lines corresponding to the first switches receive a signal, at a same frequency, phase, and amplitude as those of the touch signal, output from the synchronous signal line.

11. The method according to claim 9, wherein in the touch stage, the signal output from the first signal line is synchronous with the touch signal.

12. The method according to claim 11, wherein in the touch stage, the signal output from the first signal line is at a same frequency and phase as those of the touch signal.

13. The method according to claim 9, wherein in the touch stage, the signal output from the second signal line is synchronous with the touch signal.

14. The method according to claim 13, wherein in the touch stage, the signal output from the second signal line is at a same frequency and phase as those of the touch signal.

15. The display device according to claim 8, wherein the first switches or the second switches are P-type transistors, and the other of the first switches and the second switches are N-type transistors; and
the first signal line and the second signal line refer to a same signal line.

16. The display device according to claim 8, wherein the second signal line positioned in correspondence to the second switches is arranged in a non-display area proximate to the source drive circuit; and the first signal line positioned in correspondence to the first switches is arranged in a non-display area away from the source drive circuit.

17. The display device according to claim 8, wherein all of the second switches are electrically connected with the source drive circuit through a multiplexer.

18. The display device according to claim 8, wherein the touch display panel is a liquid crystal display panel comprising in-cell touch electrodes; or the touch display panel is an organic light emitting diode display panel comprising in-cell touch electrodes.

19. The display device according to claim 18, wherein a common electrode of the liquid crystal display panel is reused as the in-cell touch electrodes, or a cathode layer of the organic light emitting diode display panel is reused as the in-cell touch electrodes.

20. A touch display panel, comprising: a plurality of data lines, a source drive circuit, a first signal line, a second signal line, a synchronous signal line, a plurality of first switches, and a plurality of second switches, wherein:

each of the first switches corresponds to one of the data lines, and all of the first switches are electrically connected with the first signal line and the synchronous signal line; and all of the first switches are configured to be turned off under the control of a signal output from the first signal line; or to be turned on under the control of the signal output from the first signal line, so that the synchronous signal line outputs a signal synchronous with a touch signal through the first switches to their corresponding data lines; and each of the second switches corresponds to one of the data lines, and all of the second switches are electrically connected with the second signal line and the source drive circuit; and all of the second switches are configured to be turned off under the control of a signal output from the second signal line to disable the source drive circuit from outputting data signals to corresponding data lines, and to be turned on under the control of the signal output from the second signal line, so that the source drive circuit inputs data signals to corresponding data lines;

wherein the first signal line and the second signal line refer to a same signal line.

* * * * *